United States Patent
Knudsen et al.

(10) Patent No.: US 6,573,314 B1
(45) Date of Patent: Jun. 3, 2003

(54) METHOD OF PRODUCING PELLETIZED POLYOLEFIN

(75) Inventors: Karin Knudsen, Stathelle (NO); Anne-Marie Fatnes, Stathelle (NO); Magne Due, Stathelle (NO); Olav Hole, Stathelle (NO)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 09/831,167

(22) PCT Filed: Dec. 10, 1999

(86) PCT No.: PCT/GB99/04184

§ 371 (c)(1),
(2), (4) Date: May 7, 2001

(87) PCT Pub. No.: WO00/35646

PCT Pub. Date: Jun. 22, 2000

(30) Foreign Application Priority Data

Dec. 11, 1998 (GB) ............................................. 9827432

(51) Int. Cl.$^7$ ................................................. C08K 7/16
(52) U.S. Cl. ..................... 523/223; 524/570; 528/502 R
(58) Field of Search ................................. 526/348, 352, 526/351; 264/40.7, 143; 366/76

(56) References Cited

U.S. PATENT DOCUMENTS

| 3,661,330 | A | * | 5/1972 | Yamada | 241/65 |
|---|---|---|---|---|---|
| 3,771,234 | A | * | 11/1973 | Forster et al. | 34/1 |
| 4,003,136 | A | * | 1/1977 | Vincent et al. | 34/12 |
| 4,058,904 | A | * | 11/1977 | Takida et al. | 34/12 |
| 4,115,508 | A | | 9/1978 | Hughes | 264/310 |
| 4,148,768 | A | * | 4/1979 | McClain | 260/23 H |
| 4,294,744 | A | | 10/1981 | Klein et al. | 260/33.6 |
| 4,616,055 | A | * | 10/1986 | Mason | 524/381 |
| 4,636,084 | A | | 1/1987 | Kopernicky | 366/76 |
| 4,703,093 | A | | 10/1987 | Thurman | 525/387 |
| 4,921,625 | A | * | 5/1990 | Gorman et al. | 252/56 D |
| 5,098,586 | A | | 3/1992 | Rudolph | 210/785 |
| 5,729,911 | A | * | 3/1998 | Kelleher et al. | 34/400 |
| 5,942,170 | A | * | 8/1999 | Peitz | 264/40.6 |

FOREIGN PATENT DOCUMENTS

| EP | 0 489 361 | 6/1992 | | |
|---|---|---|---|---|
| EP | 0 634 439 | 1/1995 | | |
| EP | 0 733 677 | 9/1996 | | |
| GB | 983913 | 2/1965 | | |
| GB | 1 235 252 | 6/1971 | | |
| GB | 2 058 092 | 4/1981 | | |
| GB | 2 058 092 A | * 4/1981 | ......... | C08F/210/16 |
| WO | WO92/12194 | 7/1992 | | |
| WO | WO96/30180 | 10/1996 | | |

* cited by examiner

*Primary Examiner*—David W. Wu
*Assistant Examiner*—Rip A. Lee
(74) *Attorney, Agent, or Firm*—Nixon & Vanderhye P.C.

(57) ABSTRACT

Rotational moulded products are prepared by producing a mixture of a polyolefin and optionally at least one additive, extruding this mixture in melt form through orifices in a die, pelletizing the mixture extruded through the orifices to form micropellets having a particle size distribution D(v, 0.5) of 0.1 to 1 mm, and a value of the ratio of D(v, 0.9)–D(v, 0.1) to D(v, 0.5) of no more than 1, drying the micropellets to a residual water content of no more than 1% weight, and if desired packaging the micropellets.

6 Claims, 5 Drawing Sheets

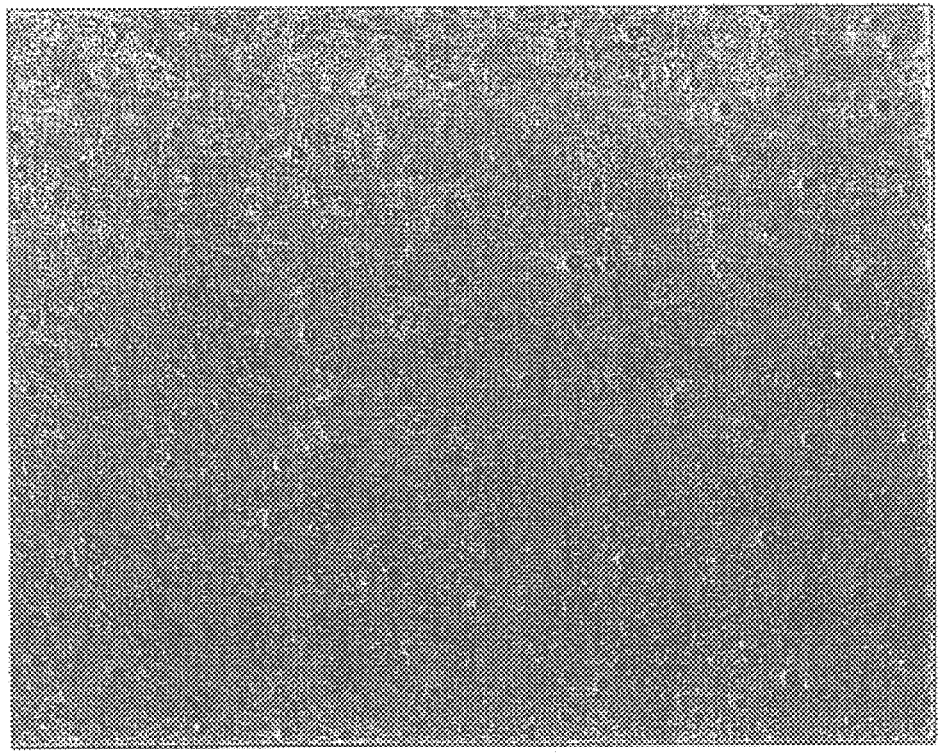
1mm  FIG. 5
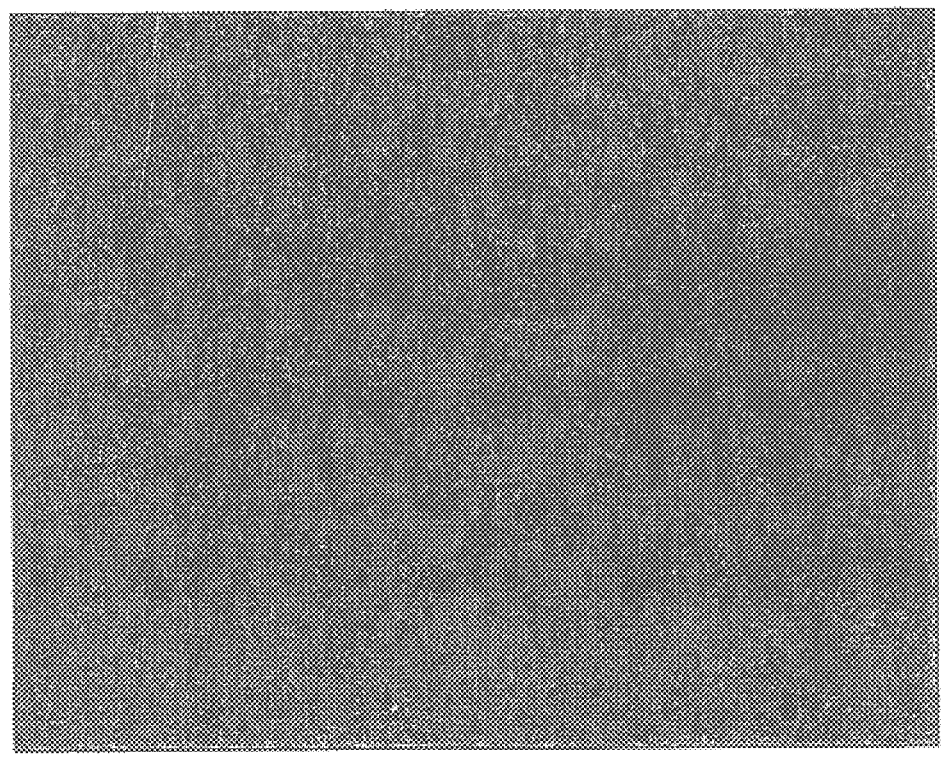
1mm  FIG. 6

METHOD OF PRODUCING PELLETIZED POLYOLEFIN

This invention relates to a method for the production of pelletized polyolefin for rotational moulding.

Rotational moulding is a moulding process in which a particulate polymer, the moulding powder, is filled into a mould which is placed in an oven and rotated so that the polymer melts and coats the inside surface of the mould. In order to ensure that the moulded product is defect free, the moulding powder must have a relatively small particle size and should preferably be uniform in particle size and composition. Generally the particle size is about 300 μm. Where, as is normal, the moulding powder has to contain colouring agents or other additives, e.g. stabilizers, the moulding powder is conventionally produced by grinding polymer pellets extruded from stabilized reactor grade powder, ie. pellets normally of size 3 to 6 mm, to the correct particle size for rotational moulding, usually with the colours or other additives being added in with the polymer pellets or mixed into the ground moulding powder. In addition to being costly, the grinding process is noisy and dusty and generally the grinding operation presents a worker unfriendly environment.

It is possible to mix polymer and additives using an extruder and to extrude pellets containing polymer and additives. The pellets however have not been found acceptable for rotational moulding as the surface of the resulting moulded product is covered with small holes, "pin holes".

We have now found that extruded micropellets may be used in rotational moulding if their water content is reduced to less than 0.1% wt ($10^3$ ppm), or more advantageously less than 200 ppm. In this way the costly and worker-unfriendly grinding step of the conventional process for production of moulding powder for rotational moulding can be avoided. Furthermore the micropellets are easier to handle than the ground powder and easier to transport using conventional conveying systems, e.g. due to dry flow capability. Moreover, having a higher bulk density, the micropellets have advantage both in terms of storage and transportation volume and in terms of the rotomoulding process itself.

Thus viewed from one aspect the invention provides a rotational moulding composition comprising a pelletized olefin polymer having a particle size distribution D(v, 0.5) of 0.1 to 1 mm, preferably 0.2 to 0.9 mm, especially 0.3 to 0.8 mm, a value of the ratio of D(v, 0.9)–D(v, 0.1) to D(v, 0.5) of no more than 1, preferably no more than 0.8, e.g. 0.45 to 0.70, and a water content of less than 0.1% wt, preferably less than 200 ppm, more preferably less than 150 ppm, especially less than 100 ppm, e.g. 10–200 ppm, especially 30 to 140 ppm.

These very dry micropellets may be produced by a mixing, pelletization and drying procedure and this forms a further aspect of the invention.

Viewed from this aspect the present invention provides a method of producing a rotational moulding micropellet composition, said method comprising:

producing a mixture of a polyolefin and optionally but preferably at least one additive, e.g. one or more selected from colouring agents, stabilizers (e.g. heat or radiation stabilizers), antioxidants, UV absorbers, antistatic agents, lubricants and fillers (e.g. organic fillers;

extruding said mixture in melt form through orifices in a die;

pelletizing the mixture extruded through said orifices to form micropellets having a particle size distribution D(v, 0.5) of 0.1 to 1 mm preferably 0.2 to 0.9 mm, etc.

and a value of the ratio of D(v, 0.9)–D(v, 0.1) to D(v, 0.5) of no more than 1, preferably no more than 0.8;

drying said micropellets to a residual water content of no more than 0.1% wt. preferably less than 200 ppm, etc.;

and if desired packaging said micropellets, e.g. in watertight containers or in microperforated containers which subsequently may be coated with a shrink wrap coating.

By virtue of the pelletization process, any additives (e.g. stabilizers (for example heat or radiation stabilizers such as UV-stabilizers, in particular HALS (Hindered amine light stabilizers)), coloring agents, antistatics, antioxidants (e.g. phenolic and phosphitic antioxidants), lubricants, etc) in the mixture being pelletized are distributed very uniformly in the resulting rotomoulding pellets. This results in a high degree of homogeneity within and between the pellets. This is very important for rotomoulding since the rotomoulding process itself does not involve an extrusion step and so cannot itself cause additive distribution to become uniform.

Typically additives such as antioxidants, lubricants and UV-stabilizers will be used in quantities of about 100 to 5000 ppm, e.g. 500 to 2500 ppm, relative to the overall polymer weight.

The method of the invention can advantageously be operated on a continuous basis although the drying procedure may operate on a batchwise basis, by operating on batches of micropellets from a continuously operating pelletizer. In this way the operability (the percentage of the time that the method is in operation) of the method may be at least 95%. Operability of at least 95% is desirable for any industrial full scale polymer moulding composition production process.

Viewed from a still further aspect the invention provides the use of the micropellet compositions of or produced by the method of the invention in rotational moulding. Viewed from an alternative aspect, the invention also provides a rotational moulding process in which a particulate polymer composition is transformed to produce a moulded product, characterised in that as said composition is used a micropellet composition of or produced by the method of the invention.

Rotational moulding is a well established technique (see for example SE-A-9203167) and the micropellets of the invention can be used in conventional rotational moulding equipment.

Generally for the method of the invention the initial feedstock will be a dry polyolefin (e.g. homo or copolymers of $C_{2-10}$ 1-olefins, more particularly homo or copolymers of ethylene or propylene, especially of ethylene) in pelletized or unpelletized form, optionally reactor grade polymer or molten polymer. The polyolefin may typically be produced by a polymerization process catalysed by Ziegler-Natta, or chromium based or metallocene or other single site catalysts. The polyolefin may have a narrow or broad molecular weight distribution; however a narrow molecular weight distribution, e.g. less than 4, is preferred. The polyolefin conveniently has a $MFR_{2.16}$ in the range 2 to 10, especially 3 to 6. PE of density 950 to 920 kg/m$^3$ is especially preferred.

Typically the initial feedstock will be at a temperature between ambient and 30° C.

Any colouring agent is preferably used in the form of a master batch, ie. already mixed with a polymer, generally the same or similar polymer as the initial feedstock. LDPE is convenient to use in this regard. The colouring agent may be an inorganic or organic material such as are conventionally used in moulded polyolefin products. Carbon black is particularly preferred.

Initial feedstock, colouring agent and any other desired additives, e.g. radiation stabilizers, antioxidants, antistatic agents, etc., can be fed to an extruder, a mixer or a melt pump by a control system that ensures the components are homogeneously mixed in the desired ratio. Generally the initial feedstock will make up at least 60% wt, more preferably at least 80% wt of the resulting mixture and that mixture will be at least 85% wt. preferably at least 90% wt. polyolefin. Thus for example 99–80% wt. particulate HDPE and 1–20% wt. of a carbon black master batch containing 40% wt. carbon black in LDPE may be fed to an extruder using two loss-in-weight feeders.

Depending on the needs of mixing and whether the polymer is already molten, a mixer, extruder or melt pump may be used to mix the components and build up the pressure necessary to ensure proper flow through the orifices of the die. Generally the mixing will involve feeding in additives from one or more storage tanks under controlled flow conditions (e.g. using appropriate controlled valves and pumps if necessary). The additives and polymer are fed to a mixer/homogenizer to create a homogeneous feed stream for the extruder. If desired, the additives may be mixed with a portion of the polymer to create an additive masterbatch and this may be fed to the extruder together with the remaining polymer. This may involve feeding the masterbatch into the polymer through a satellite extruder. The pressure at the extrusion die for the overall mixture may be up to 550 bar for example; generally however it will be between 100 and 300 bar. The temperature of the mixture as it reaches the die plate will depend on the particular polymer used but should be sufficiently high to permit the polymer to pass through the die and should be kept as low as possible in order to reduce or avoid polymer degradation.

The die plate should be of a form capable of withstanding the pressures required for extrusion of the molten polymer and the orifices should be of a diameter such that micropellets of the desired size are formed. Generally orifice diameters will be in the range 0.05 to 1.0 mm, more preferably 0.1 to 0.8 mm, still more preferably 0.2 to 0.4 mm. For industrial, large scale operation, the die-plate conveniently will contain a plurality of such orifices, e.g. 1000–50000 and be capable of extruding at least 0.25 ton/hour more preferably at least 1 ton/hour.

The pelletizer may conveniently be an underwater pelletizer operating by rotating a cutter across the downstream face of the die plate in the presence of water which cools the melt causing it to solidify quickly. The speed at which the pelletizer operates is selected according to the die plate size and number of orifices and to achieve the desired pellet size and shape. To produce micropellets according to the method of the invention may require the use of larger amounts of pelletizer water than is required for the preparation of larger pellets and accordingly the composition leaving the pelletizer generally has a very high water content, e.g. 95 to 99% wt., more generally 97 to 98% wt.

This aqueous composition is preferably screened to remove lumps and then subjected to a coarse dewatering operation, for example by passage through a pre-thickener, a conical sieve at the top of which the composition enters tangentially and the water drains out through openings (e.g. 0.15×2 mm) small enough to prevent the micropellets from passing through. The micropellets are removed through a duct at the base of the sieve. Desirably this should reduce the water content to 50–80% wt. The water removed can be recycled to the pelletizer.

The still aqueous micropellet composition may then be subjected to a second dewatering operation to reduce the water content for example to 1 to 10% wt. This may typically be achieved by using a centrifuge, e.g. a pusher centrifuge. Again the water removed may be recycled to the pelletizer. The centrifuge rotation rate and the residence time may be selected so as to achieve the desired degree of dewatering and will depend on the size of the micropellets, the size of the centrifuge and the loading of the centrifuge. Typically a g force of 300–800 g is required and the residence time is of the order of minutes, e.g. <4 minutes.

In this way the water content can be reduced to a large extent without using dryers which operate on a heating basis.

Reducing the water content of the resulting partially dried composition down to the level desired for rotational moulding can then be achieved by one or more further drying steps, e.g. by the use of a fluid bed dryer in which heated gas (e.g. air) is passed through a fluidized bed of the micropellets, or by the use of a flash dryer.

Using a fluidized bed drier with an air input temperature of about 95° C. and an outlet temperature of about 75° C. the residence time required will generally again be of the order of minutes, e.g. 7 to 13 minutes.

The water content of the pellets may be measured by the Karl Fischer method. Thus 1 g of a sample is heated to 180° C. in an oven; the evaporated water is driven into a KF-solution; and water is titrated and calculated as ppm.

After the micropellets are dried to the desired level, they will desirably be screened to remove the coarse and if necessary the fines fractions.

The dried and screened micropellets may then be conveyed for example by a normal pneumatic conveying system to be packaged and stored. After the final drying stage, e.g. during conveying, storing and packing, the micropellets are preferably maintained under dry conditions to prevent the moisture content from increasing to an undesirable level. Moreover, it is preferable that the piping used at this stage should be so selected and arranged as to avoid electrostatic charging of the micropellets and the disadvantages that might result therefrom, e.g. cross-contamination between sequential product runs on the same equipment.

Viewed from a still further aspect the invention provides apparatus for the production of rotational moulding polyolefin pellets, said apparatus comprising:

(i) a mixer arranged to provide a mixture of a polyolefin and at least one additive;

(ii) an extruder and pelletizer arranged to extrude and pelletize said mixture;

(iii) an centrifuge arranged to dewater said mixture; and (iv) a fluidized bed drier arranged to dry said dewatered mixture, e.g. to a water content of no more than 1% by weight, preferably no more than 0.1% by weight, especially no more than 200 ppm, etc.

In this apparatus, the extruder and pelletizer is preferably arranged to generate pellets having a particle size distribution D(v, 0.5) of 0.1 to 1 mm, and a value of the ratio of D(v, 0.9)–D(v, 0.1) to D(v, 0.5) of no more than 1. Moreover, excess water is preferably drained off the pelletized mixture prior to centrifugation, e.g. in a pre-thickener as described above.

Since the micropellets according to the invention are so dry, rotomoulded products can be made therewith without surface pitting and irregularities which give rise to poor mechanical properties and unfavorable appearance.

Comparison of rotomoulded products produced using such rotomoulding pellets showed the numbers of visible "pinholes" (holes visible on the product surface using light microscopy and of at least 100 $\mu$m diameter) to decrease as the water content of the pellets is reduced so that at a water content of below about 150 ppm (wt.) pinholes were no longer visible by light microscopy. Between 270 and 160 ppm, the number of pinholes visible by light microscopy dropped by a factor of about 34. At 80 ppm, no pinholes were visible on a 195 mm×195 mm test surface. Pinhole surface density may readily be assessed by counting the number of pinholes of diameter 100 µm or more on an area (e.g. 10 cm$^2$ to 50 cm$^2$) of the rotomoulded product, for example using light microscopy. Thus viewed from a further aspect the invention provides a rotomoulded polymer (e.g. polyolefin) article having a pinhole density on its surface of less than 10/cm$^2$, preferably less than 5/cm$^2$, more preferably less than 1/cm$^2$.

As mentioned above, the pellets of the invention have improved dry flow and bulk density compared to the equivalent polymers in ground form. Thus for example, for one polymer the pellets according to the invention had dry flow and bulk density values (according to ASTM-D 1895-89) of 14 s/100 g and 476 kg/m$^3$ as compared to values of 22 s/100 g and 360 kg/m$^3$ for the ground polymer.

Embodiments of the invention will now be described with reference to the following non-limiting Examples and the accompanying drawings in which:

FIGS. 5 and 6 are light microscopy images of surfaces of two rotomoulded products.

Figure 1:
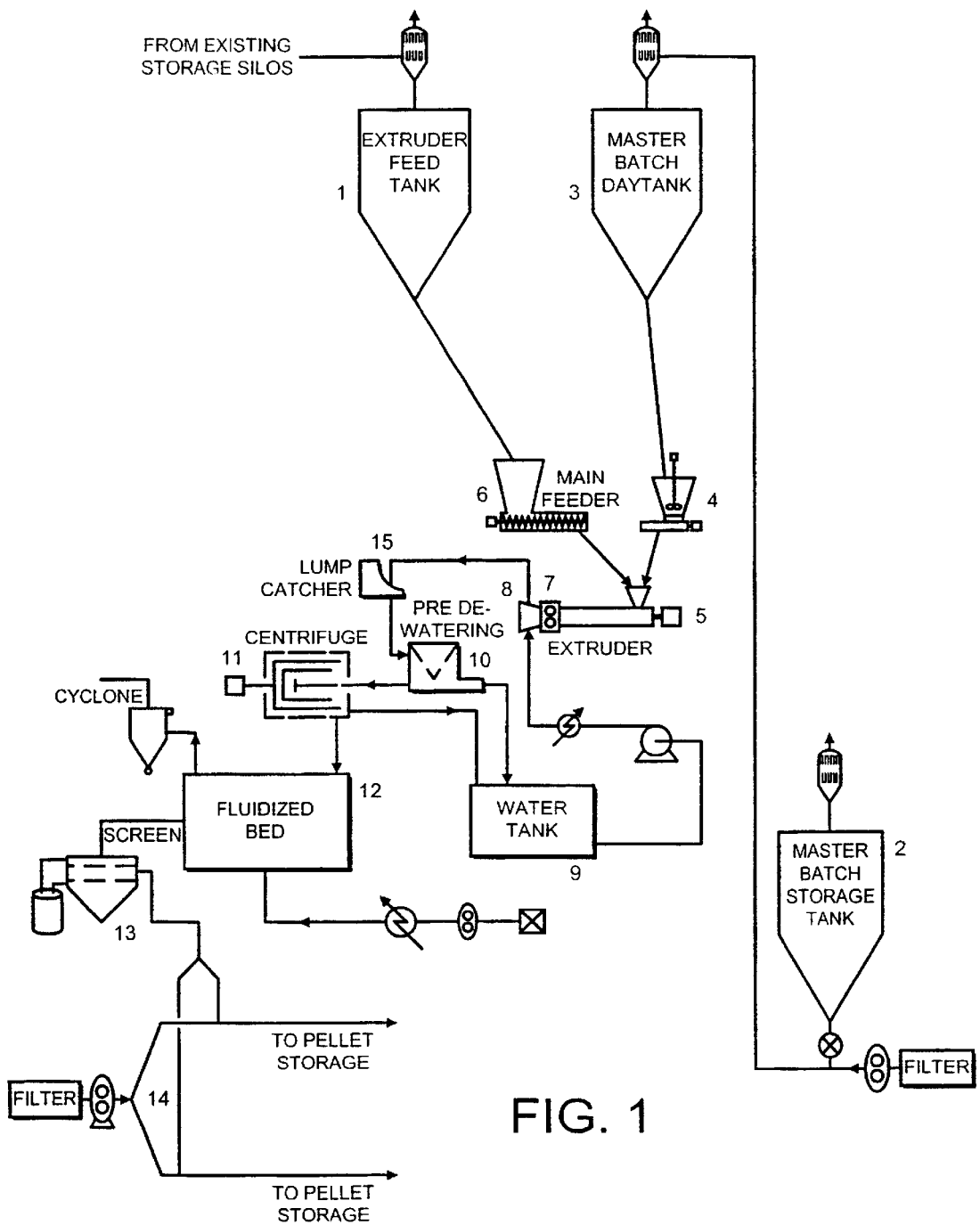
FIG. 1 is a flow sheet illustrating the process stages of one embodiment of the method of the invention.

Referring to FIG. 1, polymer is fed from storage silos to extruder feed tank 1 and carbon black master batch is fed from storage tank 2 to extruder feed tank 3. From feed tank 1 the polymer is fed to extruder 5 via standard loss-in-weight feeder 6. The master batch is fed from tank 3 to a loss in weight feeder 4 and then to extruder 5. If desired, other additives, e.g. in master batch form, may be blended in, optionally together with the carbon black master batch or from independent parallel feeders (not shown). The extruder 5 may be a standard extruder available from Werner & Pfleiderer (e.g. ZSK70MC), Berstorff, or Kobe Steel (e.g. Hyperktx 59 xht). In extruder 5, polymer and master batch are mixed, brought into melt form and passed via gear pump 7 through a die plate into pelletizer 8 which is fed with pelletizer water from water tank 9. Suitable die plates are available from BKG or Gala.

The aqueous micropellet containing product produced by pelletizer 8 is passed through a lump catcher 15 into a pre-thickener 10 as described above. Suitable pre-thickeners are available from Krauss-Mafei (e.g. EC800). The separated water is returned to tank 9 and the concentrated aqueous micropellet composition is passed into pusher centrifuge 11. Suitable centrifuges are available from Krauss-Mafei (e.g. SZ32). Water removed by the centrifuge is returned to tank 9 and the centrifuged micropellets are passed to fluidized bed drier 12. Suitable fluidized bed driers are available from Buhler (e.g. OTWG160) or Niro A/S (e.g. Vibro-Fluidizer). The dried micropellets from drier 12 are screened by screen 13 and conveyed by pneumatic conveyors 14 to be stored and/or packed.

EXAMPLE 1

A mixture of 94 parts by weight HDPE (Borecene ME8168 (MFR$_2$=6, density=934 g/L and containing antioxidants, UV-stabilizers and lubricants at about parts per thousand (by weight) levels) from Borealis) and 6 parts by weight of a carbon black master batch (containing 60% wt. LDPE and 40% wt. carbon black) was extruded and pelletized as a melt at about 250° C. through a die plate which had 0.4 mm orifices and was heated to about 290° C. Samples of the resulting pellets were dried to residual water contents of between 60 and 200 ppm.

Figure 2:
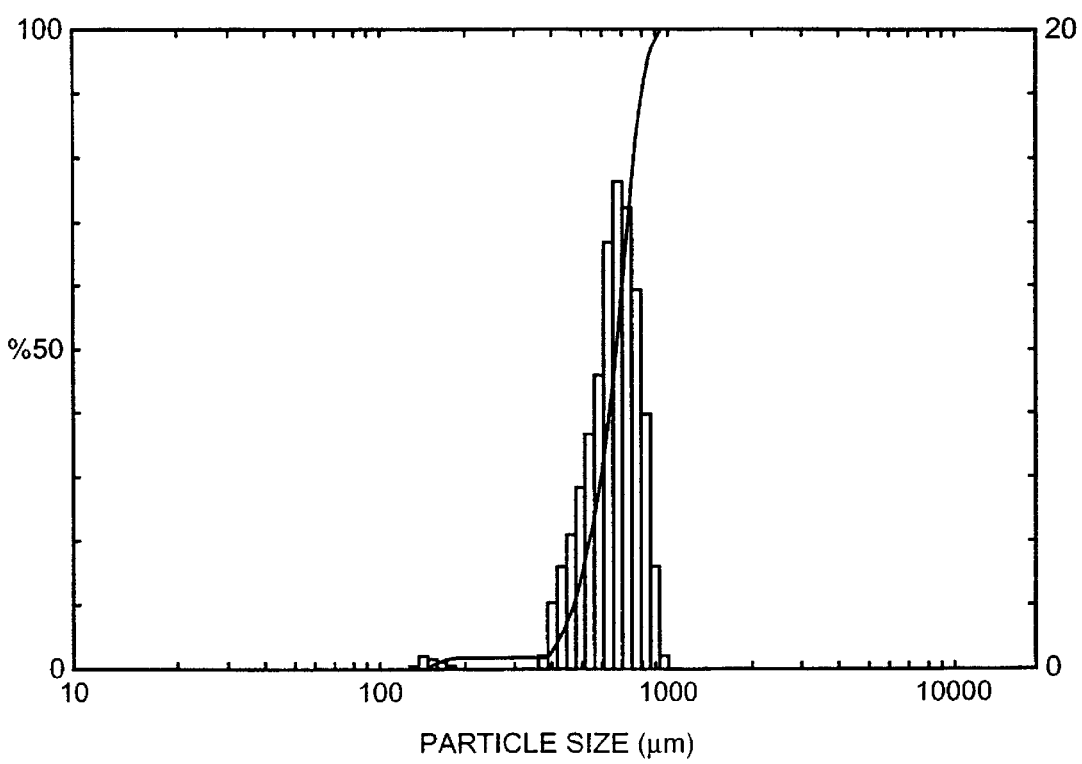
FIGS. 2 to 4 are particle size distribution curves for examples of the compositions of the invention.

The particle size distribution, shown in FIG. 2, was measured using a Malvern Instruments particle size analyser. The particle size distribution was: D(v, 0.9) 797 µm, D(v, 0.1) 462 µm and D(v, 0.5) 642 µm, ie. (D(v, 0.9)–D(v, 0.1))/(D(v, 0.5))=0.52.

Figure 3:
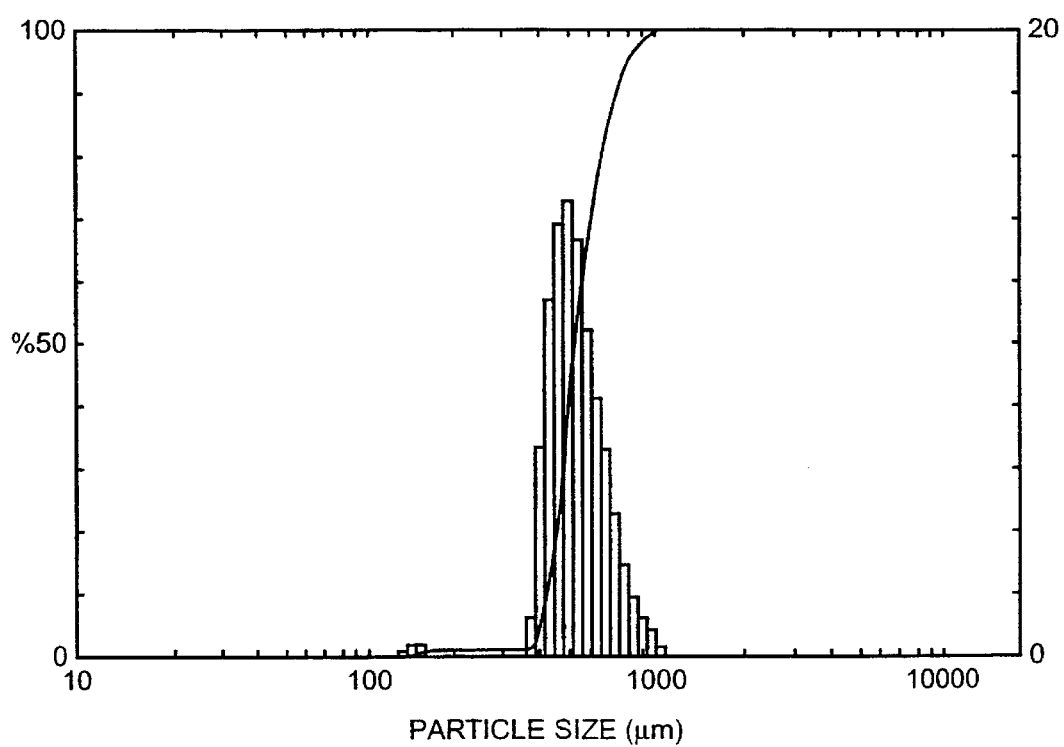
Figure 4:
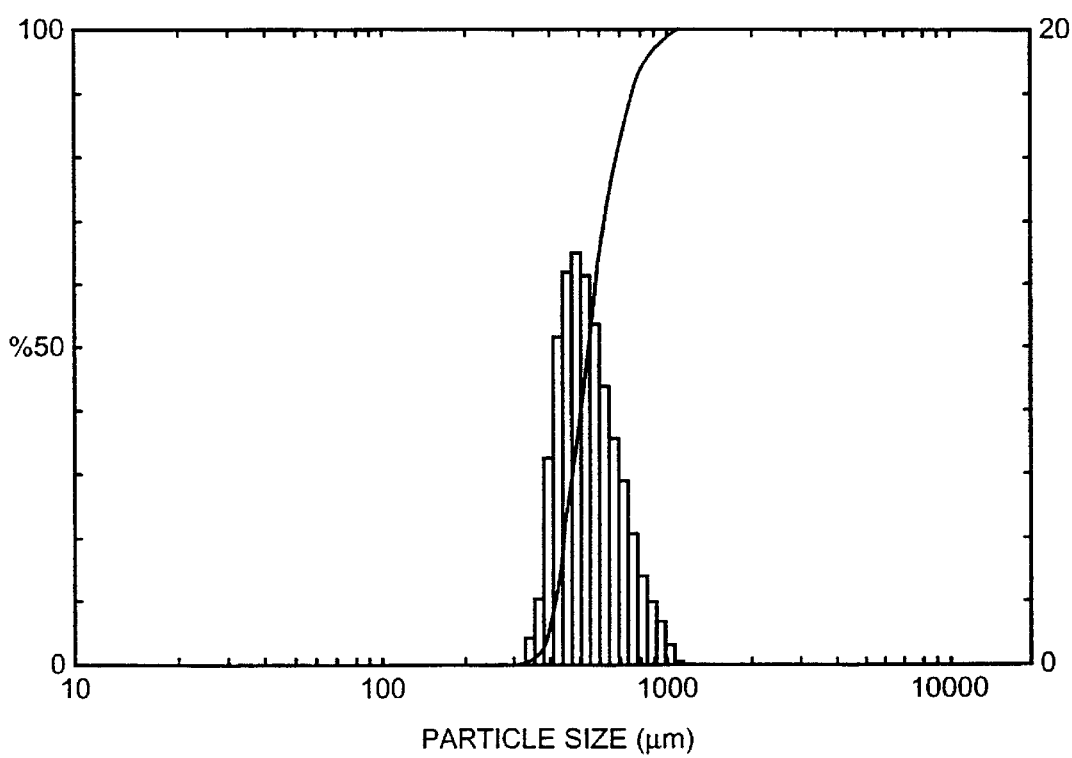

Two further samples of micropellets were produced analogously, in the first case using a die plate with 0.3 mm apertures and in the second case using Borecene ME 8166 (MFR$_2$ =3, density=940 g/L) in place of ME8168 and using a die plate with 0.3 mm apertures. The particle size distributions, shown in FIGS. 3 and 4 respectively were : D(v, 0.9) 701 µm, D(v, 0.1) 410 µm and D(v, 0.5) 510 µm, (i.e. ((D(v, 0.9)–D(v, 0.1))/D(v, 0.5)=0.57) and D(v, 0.9) 740 µm, D(v, 0.1) 410 µm and D(v, 0.5) 523 µm (i.e ((D(v, 0.9)–D(v, 0.1))/D(v, 0.5)=0.63)

EXAMPLE 2

Pinhole Density

Micropellets, prepared analogously to those of Example 1, were rehydrated to water contents of 80 to 7000 ppm (by weight). The water contents were measured by the Karl Fisher method (for lower water contents) and by gravimetry (for higher water contents).

Cubic boxes were prepared using the different samples using a Rotospeed E-60 rotomoulding apparatus at an oven temperature of 270° C. The same face of the box was cut off in each case and cleaned. A mask with eight 14 mm×18 mm windows was placed over the cut and cleaned face and, using a Wild Photo macroscope M420 with ring lightening, a digital picture was taken of each window and transferred to a computer. The images were processed to determine the number of surface pinholes greater than 100 µm in diameter. FIGS. 5 and 6 show such images of surfaces produced using 270 ppm wt and 160 ppm wt water content micropellets. As can be seen, at 160 ppm wt water content, virtually no pinholes can be detected.

What is claimed is:

1. A method of producing a rotational moulding micropellet composition, said method comprising:

producing a mixture of a polyolefin and optionally at least one additive;

extruding said mixture in melt form through orifices in a die;

pelletizing the mixture extruded through said orifices to form micropellets having a particle size distribution D(v, 0.5) of 0.1 to 1 mm, and a value of the ratio of D(v, 0.9)–D(v, 0.1) to D(v, 0.5) of no more than 1;

drying said micropellets to a residual water content of no more than 1% wt;

and if desired packaging said micropellets.

2. A method as claimed in claim 1 wherein said mixture is pelletized to form micropellets having a ratio D(v, 0.9)–D(v, 0.1)/D(v, 0.5) of up to 0.8.

3. A method as claimed in claim 1 wherein said micropellets are dried to a residual water content of less than 0.1% wt.

4. A method as claimed in claim 1 wherein said micropellets are dried to a residual water content of up to 150 ppm by weight.

5. A method as claimed in claim 1 wherein said mixture comprises at least one additive selected from coloring agents, stabilizers, antioxidants, UV absorbers, antistatics, lubricants and fillers.

6. A method of producing a rotational moulded product comprising:
(a) producing a mixture of a polyolefin and optionally at least one additive;
(b) extruding said mixture in melt form through orifices in a die;
(c) pelletizing the mixture extruded through said orifices to form micropellets having a particle size distribution D(v, 0.5) of 0.1 to 1 mm, and a value of the ratio of D(v, 0.9)–D(v, 0.1) to D(v, 0.5) of no more than 1;
(d) drying said micropellets to a residual water content of no more than 1% wt;
(e) filling a mould with the micropellets of step (d);
(f) placing the filled mould in an oven, and
(g) rotating the mould in the oven so that the composition melts and coats the inside surface of the mould.

* * * * *